(12) United States Patent
Lewis

(10) Patent No.: US 10,667,328 B1
(45) Date of Patent: May 26, 2020

(54) METHOD AND SYSTEM FOR IMPLEMENTING INTELLIGENCE ENABLED THINGS (IET)

(71) Applicant: CenturyLink Intellectual Property LLC, Broomfield, CO (US)

(72) Inventor: Ronald A. Lewis, Bastrop, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/363,918

(22) Filed: Mar. 25, 2019

Related U.S. Application Data

(60) Provisional application No. 62/792,753, filed on Jan. 15, 2019.

(51) Int. Cl.
*H04W 84/18* (2009.01)
*H04W 4/70* (2018.01)
*H04W 4/029* (2018.01)
*H04W 4/80* (2018.01)

(52) U.S. Cl.
CPC .......... *H04W 84/18* (2013.01); *H04W 4/029* (2018.02); *H04W 4/70* (2018.02); *H04W 4/80* (2018.02)

(58) Field of Classification Search
CPC ...... H04L 12/1886; H04L 67/02; H04L 67/10
See application file for complete search history.

(56) References Cited

U.S. PATENT DOCUMENTS 9,997,079 B2 * 6/2018 Paczan .................. G08G 5/045

\* cited by examiner

*Primary Examiner* — Chandrahas B Patel

(57) ABSTRACT

Novel tools and techniques are provided for implementing intelligence enabled things ("IET"). In various embodiments, a first IET tag affixed to a first object among a plurality of objects might receive information regarding the first object and/or nearby objects. The first IET tag might determine a status of the first object and/or the nearby objects based at least partly on the received information and based at least partly on first data assigned to the first IET tag. The first IET tag might analyze the determined status to determine whether the determined status exceeds predetermined thresholds for normal parameters for the first object and/or the nearby objects. Based on a determination that the determined status exceeds predetermined thresholds for normal parameters for the first object and/or the nearby objects, the first IET tag might autonomously self-report to a computing system a state of the first object and/or the nearby objects.

20 Claims, 7 Drawing Sheets

METHOD AND SYSTEM FOR IMPLEMENTING INTELLIGENCE ENABLED THINGS (IET)

CROSS-REFERENCES TO RELATED APPLICATIONS

This application claims priority to U.S. Patent Application Ser. No. 62/792,753 (the "'753 Application"), filed Jan. 15, 2019 by Ronald A. Lewis, entitled, "Method and System for Implementing Intelligence Enabled Things (IET)," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing communications among objects, and, more particularly, to methods, systems, and apparatuses for implementing intelligence enabled things ("IET").

BACKGROUND

In conventional systems, Internet of Things ("IoT") functionality provides autonomous communications among IoT devices. However, such communications are typically limited to communications of data collected by the IoT devices, where such data are sent to a central computing system or to an external distributed computing system that analyzes the data and subsequently directs the IoT devices to perform tasks.

Such conventional systems, however, typically do not allow the IoT devices to analyze their own statuses and situations, and to perform tasks on their own or to at least self-report their status and situation.

Hence, there is a need for more robust and scalable solutions for implementing communications among objects, and, more particularly, to methods, systems, and apparatuses for implementing intelligence enabled things ("IET").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
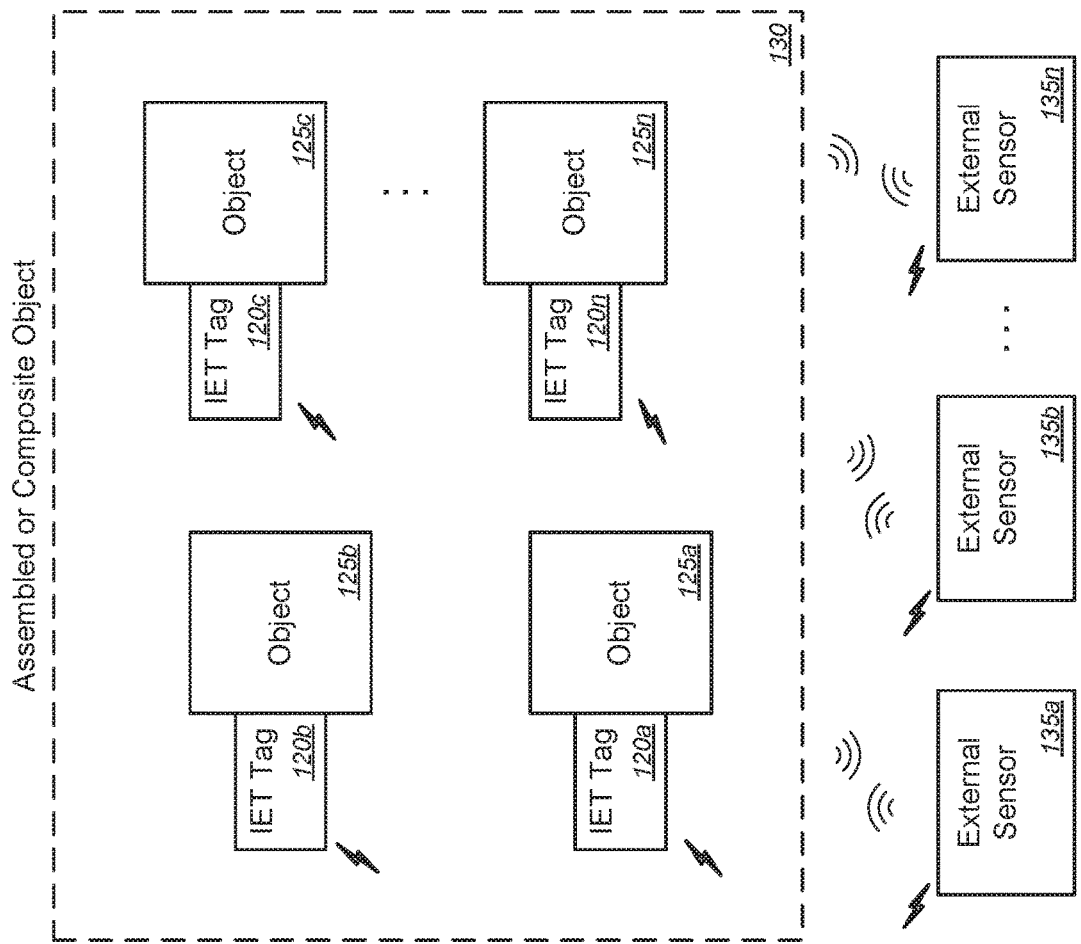
FIG. 1 is a schematic diagram illustrating a system for implementing intelligence enabled things ("IET"), in accordance with various embodiments.
Figure 1:
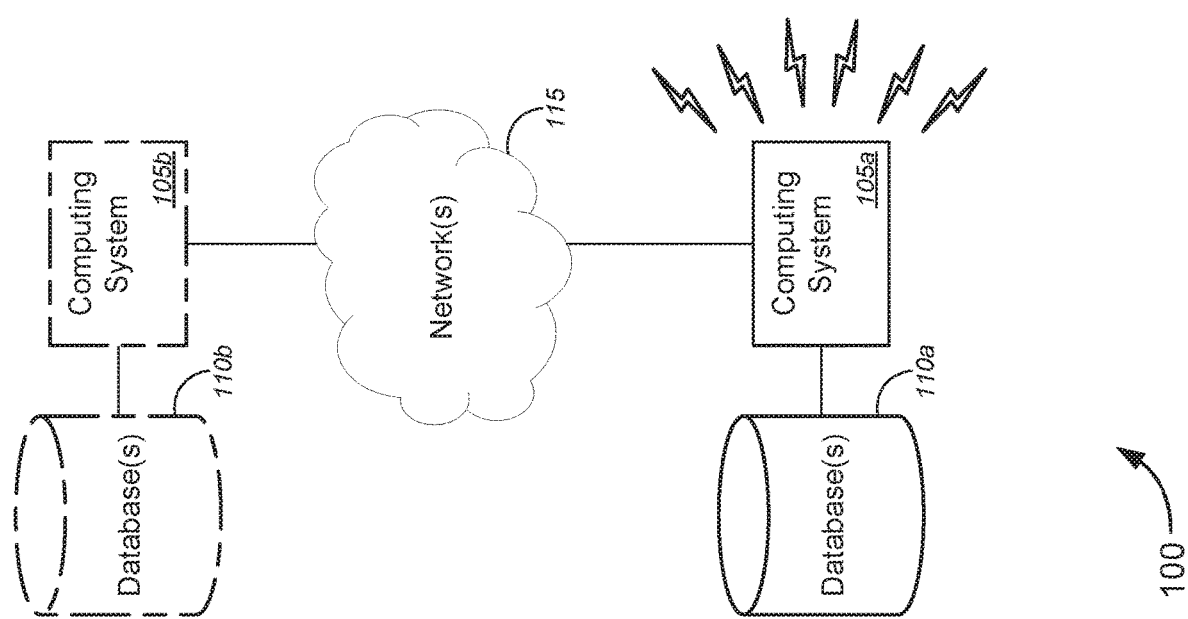

Various embodiments provide tools and techniques for implementing communications among objects, and, more particularly, to methods, systems, and apparatuses for implementing intelligence enabled things ("IET").

In various embodiments, a first IET tag affixed to a first object among a plurality of objects might receive information regarding at least one of the first object or one or more nearby objects. The first IET tag might determine a status of the at least one of the first object or the one or more nearby objects based at least in part on the received information regarding the at least one of the first object or the one or more nearby objects and based at least in part on first data assigned to the first IET tag. The first IET tag might analyze the determined status to determine whether the determined status exceeds predetermined thresholds for normal parameters for the at least one of the first object or the one or more nearby objects. Based on a determination that the determined status exceeds predetermined thresholds for normal parameters for the at least one of the first object or the one or more nearby objects, the first IET tag might autonomously self-report to a computing system a state of the at least one of the first object or the one or more nearby objects.

Merely by way of example, in some instances, the first data might include, but is not limited to, at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects, and/or the like.

According to some embodiments, receiving the information regarding the at least one of the first object or the one or more nearby objects might comprise receiving, from one or more sensors disposed on at least one object among the plurality of objects, sensor data regarding the at least one of the first object or the one or more nearby objects. In some cases, the sensor data might include, without limitation, at least one of image data, video data, radar data, lidar data, temperature data, humidity data, moisture data, ambient light data, seismic data, vibration data, location data, or proximity data, and/or the like. Alternatively, or additionally, receiving the information regarding the at least one of the first object or the one or more nearby objects might comprise receiving, from one or more external devices within proximity to the at least one of the first object or the one or more nearby objects, external sensor data regarding the at least one of the first object or the one or more nearby objects. In some instances, the one or more external devices might each include, but is not limited to, one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor, and/or the like.

In some embodiments, autonomously self-reporting the state of the at least one of the first object or the one or more nearby objects might comprise autonomously sending, with the first IET tag and to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

According to some embodiments, the plurality of objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the plurality of objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

In the manner described herein, the IET tags provide intelligence enabled things functionality to the assembly or construction of the house. In a similar manner, other objects (e.g., other building structures, vehicles, machines, etc.) may be assembled or constructed using intelligence enabled things functionality to facilitate efficient and improved construction of the objects. As a further extension of such functionality, the IET tags may continue to self-analyze and self-report their status over time.

These and other aspects of the IET functionality are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, autonomous device communications technology, intelligence enabled things ("IET") technology, and/or the like. In other aspects, certain embodiments, can improve the functioning of user equipment or systems themselves (e.g., IET devices, other devices, etc.), for example, by receiving, with a first IET tag affixed to a first object among a plurality of objects, information regarding at least one of the first object or one or more nearby objects among the plurality of objects; determining, with the first IET tag, a status of the at least one of the first object or the one or more nearby objects based at least in part on the received information regarding the at least one of the first object or the one or more nearby objects and based at least in part on first data assigned to the first IET tag; analyzing, with the first IET tag, the determined status to determine whether the determined status exceeds predetermined thresholds for normal parameters for the at least one of the first object or the one or more nearby objects; and based on the determination that the determined status exceeds predetermined thresholds for normal parameters for the at least one of the first object or the one or more nearby objects, autonomously self-reporting, with the first IET tag and to a computing system, a state of the at least one of the first object or the one or more nearby objects; and/or the like. In particular, to the extent any abstract concepts are present in the various embodiments, those concepts can be implemented as described herein by devices, software, systems, and methods that involve specific novel functionality (e.g., steps or operations), such as, providing intelligence enabled things functionality to the assembly, construction, or maintenance of objects (e.g., buildings, building structures, vehicles, machines, etc.). As a further extension of such functionality, IET tags that may be used to provide IET functionality may continue to self-analyze and self-report their status over time. These functionalities can produce tangible results outside of the implementing computer system, including, merely by way of example, optimized and efficient assembly, construction, and/or maintenance of such objects, and/or the like, at least some of which may be observed or measured by users and/or service providers.

In an aspect, a method might be provided for implementing intelligence enabled things ("IET"). The method might comprise receiving, with a first IET tag affixed to a first object among a plurality of objects, information regarding at least one of the first object or one or more nearby objects among the plurality of objects; and determining, with the first IET tag, a status of the at least one of the first object or the one or more nearby objects based at least in part on the received information regarding the at least one of the first object or the one or more nearby objects and based at least in part on first data assigned to the first IET tag. The method might further comprise analyzing, with the first IET tag, the determined status to determine whether the determined status exceeds predetermined thresholds for normal parameters for the at least one of the first object or the one or more nearby objects; and based on the determination that the determined status exceeds predetermined thresholds for normal parameters for the at least one of the first object or the one or more nearby objects, autonomously self-reporting, with the first IET tag and to a computing system, a state of the at least one of the first object or the one or more nearby objects.

In some embodiments, the first IET tag might comprise at least one of an open source IoT platform, a microprocessor, a microcontroller, a processor, or a portable computer, and/or the like. In some cases, the first IET tag might further comprise at least one of one or more sensors, one or more power sources, one or more communications transceivers, or a protective housing, and/or the like. In some instances, the computing system might comprise at least one of an open source IoT platform, a microprocessor, a microcontroller, a processor, a portable computer, a server, a distributed computing system, or a cloud-based computing system, and/or the like.

Merely by way of example, in some cases, the first data might comprise at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects, and/or the like.

According to some embodiments, receiving the information regarding the at least one of the first object or the one or more nearby objects might comprise receiving, from one or more sensors disposed on at least one object among the plurality of objects, sensor data regarding the at least one of the first object or the one or more nearby objects. In some instances, the sensor data might comprise at least one of image data, video data, radar data, lidar data, temperature data, humidity data, moisture data, ambient light data, seismic data, vibration data, location data, or proximity data, and/or the like. Alternatively, receiving the information regarding the at least one of the first object or the one or more nearby objects might comprise receiving, from one or more external devices within proximity to the at least one of the first object or the one or more nearby objects, external sensor data regarding the at least one of the first object or the one or more nearby objects. In some cases, the one or more external devices might each comprise one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor, and/or the like.

In some embodiments, autonomously self-reporting the state of the at least one of the first object or the one or more nearby objects might comprise autonomously sending, with the first IET tag and to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

According to some embodiments, the plurality of objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. The plurality of objects might comprise at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

Alternatively, the plurality of objects, when assembled, might form part of a vehicle. The plurality of objects might comprise at least one of one or more vehicle engine component pieces, one or more vehicle control system component pieces, one or more vehicle control panel pieces, one or more steering component pieces, one or more gear shift components, one or more braking system component pieces, one or more fuel injection component pieces, one or more fuel storage component pieces, one or more vehicle sensor component pieces, one or more vehicle battery component pieces, one or more vehicle batteries, one or more electrical system component pieces, one or more electronics system components, one or more communications system component pieces, one or more vehicle exterior panel pieces, one or more chassis components, one or more exhaust system components, one or more windshield pieces, one or more window pieces, one or more window opening and closing mechanism components, one or more door components, one or more door lock component pieces, one or more door handle component pieces, one or more wiper components, one or more bolts, one or more nuts, one or more screws, one or more brackets, one or more hinges, one or more springs, one or more clamps, one or more mountings, one or more display component pieces, one or more lighting system components, one or more signal light system components, one or more environmental control components, one or more tires, one or more wheels, one or more seat components, one or more seatbelt components, one or more seat adjustment control components, one or more suspension system components, one or more storage container components, one or more wing components, one or more rotor components, one or more propeller system components, one or more hull components, one or more keel components, one or more mast components, one or more boom components, one or more sail pieces, one or more tiller components, one or more rudder components, one or more doorway components, one or more porthole components, one or more antenna components, one or more foot pedal components, one or more frame components, one or more subframe components, one or more fender component, one or more throttle components, one or more chain components, one or more pump system components, one or more handle components, or one or more mirror components, and/or the like.

Alternatively, the plurality of objects, when assembled, might form part of a machine. The plurality of objects might comprise at least one of one or more mechanical component pieces, one or more electrical system component pieces, one or more electronics system components, one or more communications system components, one or more control system component pieces, one or more display system component pieces, one or more user interface system components, one or more housing pieces, one or more frame component pieces, one or more subframe component pieces, one or more latching system components, one or more power supply system components, one or more bolts, one or more nuts, one or more screws, one or more brackets, one or more hinges, one or more springs, one or more clamps, one or more mountings, one or more lighting system component pieces, one or more display light system component pieces, one or more handle components, one or more foot component pieces, one or more wheel component pieces, or one or more locking system components, and/or the like.

In another aspect, an intelligence enabled things ("IET") tag might be provided that is affixed to a first object among a plurality of objects. The IET tag might comprise at least one processor and a non-transitory computer readable medium communicatively coupled to the at least one processor. The non-transitory computer readable medium might have stored thereon computer software comprising a set of instructions that, when executed by the at least one processor, causes the IET tag to: receive information regarding at least one of the first object or one or more nearby objects among the plurality of objects; determine a status of the at least one of the first object or the one or more nearby objects based at least in part on the received information regarding the at least one of the first object or the one or more nearby objects and based at least in part on first data assigned to the first IET tag; analyze the determined status to determine whether the determined status exceeds predetermined thresholds for normal parameters for the at least one of the first object or the one or more nearby objects; and based on the determination that the determined status exceeds predetermined thresholds for normal parameters for the at least one of the first object or the one or more nearby objects, autonomously self-report, to a computing system, a state of the at least one of the first object or the one or more nearby objects.

In some embodiments, the IET tag might comprise at least one of an open source IoT platform, a microprocessor, a microcontroller, a processor, or a portable computer, and/or the like. In some cases, the IET tag might further comprise at least one of one or more sensors, one or more power sources, one or more communications transceivers, or a protective housing, and/or the like. In some instances, the computing system might comprise at least one of an open source IoT platform, a microprocessor, a microcontroller, a processor, a portable computer, a server, a distributed computing system, or a cloud-based computing system, and/or the like.

In yet another aspect, a system might be provided for implementing intelligence enabled things ("IET"). The system might comprise an IET tag affixed to a first object among a plurality of objects. The IET tag might comprise at least one processor and a non-transitory computer readable medium communicatively coupled to the at least one processor. The non-transitory computer readable medium might have stored thereon computer software comprising a set of instructions that, when executed by the at least one processor, causes the IET tag to: receive information regarding at least one of the first object or one or more nearby objects among the plurality of objects; determine a status of the at least one of the first object or the one or more nearby objects based at least in part on the received information regarding the at least one of the first object or the one or more nearby objects and based at least in part on first data assigned to the first IET tag; analyze the determined status to determine whether the determined status exceeds predetermined thresholds for normal parameters for the at least one of the first object or the one or more nearby objects; and based on the determination that the determined status exceeds predetermined thresholds for normal parameters for the at least one of the first object or the one or more nearby objects, autonomously self-report, to a computing system, a state of the at least one of the first object or the one or more nearby objects.

In some embodiments, the IET tag might comprise at least one of an open source IoT platform, a microprocessor, a microcontroller, a processor, or a portable computer, and/or the like.

According to some embodiments, autonomously self-reporting the state of the at least one of the first object or the one or more nearby objects might comprise autonomously sending, to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing communications among objects, and, more particularly, to methods, systems, and apparatuses for implementing intelligence enabled things ("IET"), as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing intelligence enabled things ("IET"), in accordance with various embodiments.

In the non-limiting embodiment of FIG. 1, system 100 might comprise a computing system 105a and corresponding database(s) 110a. System 100 might further comprise a network(s) 115. System 100 might further comprise a plurality of IET tags 120a-120n, each IET tag 120 being affixed to an object 125a-125n among a plurality of objects 125 that, when assembled, form an assembled or composite object 130. System 100 might also comprise a plurality of external sensors 135a-135n (collectively, "external sensors 135" or the like). In some cases, system 100 might further comprise a (remote) computing system 105b (optional) and corresponding database(s) 110b (optional) that are accessible to or by the IET tags 120 or external sensors 135 via network(s) 115.

In some embodiments, the IET tags 120 might each include, without limitation, at least one of an open source IoT platform, a microprocessor, a microcontroller, a processor, or a portable computer, and/or the like. In some cases, the IET tags 120 might each include, but is not limited to, at least one of one or more sensors, one or more power sources, one or more communications transceivers, or a protective housing, and/or the like. In some instances, the computing system 105a (or remote computing system 105b) might include, without limitation, at least one of an open source IoT platform, a microprocessor, a microcontroller, a processor, a portable computer, a server, a distributed computing system, or a cloud-based computing system, and/or the like.

In operation, a first IET tag (e.g., one of IET tag 120a-120n) affixed to a first object among the plurality of objects (e.g., one of objects 125a-125n) might receive information regarding at least one of the first object or one or more nearby objects (e.g., among the plurality of objects 125, or the like). The first IET tag might determine a status of the at least one of the first object or the one or more nearby objects based at least in part on the received information regarding the at least one of the first object or the one or more nearby objects and based at least in part on first data assigned to the first IET tag. The first IET tag might analyze the determined status to determine whether the determined status exceeds predetermined thresholds for normal parameters for the at least one of the first object or the one or more nearby objects. Based on the determination that the determined status exceeds predetermined thresholds for normal parameters for the at least one of the first object or the one or more nearby objects, the first IET tag might autonomously self-report to a computing system (e.g., computing system 105a or 105b, or the like) a state of the at least one of the first object or the one or more nearby objects.

Merely by way of example, in some instances, the first data might include, but is not limited to, at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects, and/or the like.

According to some embodiments, receiving the information regarding the at least one of the first object or the one or more nearby objects might comprise receiving, from one or more sensors disposed on at least one object among the plurality of objects, sensor data regarding the at least one of the first object or the one or more nearby objects. In some cases, the sensor data might include, without limitation, at least one of image data, video data, radar data, lidar data, temperature data, humidity data, moisture data, ambient light data, seismic data, vibration data, location data, or proximity data, and/or the like. Alternatively, or additionally, receiving the information regarding the at least one of the first object or the one or more nearby objects might comprise receiving, from one or more external devices within proximity to the at least one of the first object or the one or more nearby objects, external sensor data regarding the at least one of the first object or the one or more nearby objects. In some instances, the one or more external devices might each include, but is not limited to, one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor, and/or the like.

In some embodiments, autonomously self-reporting the state of the at least one of the first object or the one or more nearby objects might comprise autonomously sending, with the first IET tag and to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

According to some embodiments, the plurality of objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the plurality of objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

In some embodiments, the plurality of objects, when assembled, might form part of a vehicle, which might include, but is not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. The plurality of objects might include, without limitation, at least one of one or more vehicle engine component pieces, one or more vehicle control system component pieces, one or more vehicle control panel pieces, one or more steering component pieces, one or more gear shift components, one or more braking system component pieces, one or more fuel injection component pieces, one or more fuel storage component pieces, one or more vehicle sensor component pieces, one or more vehicle battery component pieces, one or more vehicle batteries, one or more electrical system component pieces, one or more electronics system components, one or more communications system component pieces, one or more vehicle exterior panel pieces, one or more chassis components, one or more exhaust system components, one or more windshield pieces, one or more window pieces, one or more window opening and closing mechanism components, one or more door components, one or more door lock component pieces, one or more door handle component pieces, one or more wiper components, one or more bolts, one or more nuts, one or more screws, one or more brackets, one or more hinges, one or more springs, one or more clamps, one or more mountings, one or more display component pieces, one or more lighting system components, one or more signal light system components, one or more environmental control components, one or more tires, one or more wheels, one or more seat components, one or more seatbelt components, one or more seat adjustment control components, one or more suspension system components, one or more storage container components, one or more wing components, one or more rotor components, one or more propeller system components, one or more hull components, one or more keel components, one or more mast components, one or more boom components, one or more sail pieces, one or more tiller components, one or more rudder components, one or more doorway components, one or more porthole components, one or more antenna components, one or more foot pedal components, one or more frame components, one or more subframe components, one or more fender component, one or more throttle components, one or more chain components, one or more pump system components, one or more handle components, or one or more mirror components, and/or the like.

According to some embodiments, the plurality of objects, when assembled, might form part of a machine. In such cases, the plurality of objects might include, but is not limited to, at least one of one or more mechanical component pieces, one or more electrical system component pieces, one or more electronics system components, one or more communications system components, one or more control system component pieces, one or more display system component pieces, one or more user interface system components, one or more housing pieces, one or more frame component pieces, one or more subframe component pieces, one or more latching system components, one or more power supply system components, one or more bolts, one or more nuts, one or more screws, one or more brackets, one or more hinges, one or more springs, one or more clamps, one or more mountings, one or more lighting system component pieces, one or more display light system component pieces, one or more handle components, one or more foot component pieces, one or more wheel component pieces, or one or more locking system components, and/or the like.

In some aspects, the IET tags provide self-awareness to objects that, when assembled, form a larger object (whether structure, vehicle, or machine, and/or the like). In some embodiments, each of the IET tags (or each of one or more main nodes among the IET tags) might have access to a bill of lading or a plan for assembling the larger object. In some cases, each IET tag might self-identify and/or might identify the object to which it is affixed. In some instances, each IET tag might self-report tolerances to other IET tags or to a managing computing system (e.g., computing system 105*a* or 105*b*, or the like).

In a non-limiting example, a washer, which might have affixed thereon an IET tag, might be in the process of being put in an engine. The IET tag affixed to the washer might determine, based at least in part on analysis of at least a portion of a plan of the engine, that the washer is not the correct size for the portion of the engine in which the washer is being put. Based on such determination, the IET tag affixed to the washer might self-report to at least one of a computing system managing construction or repair of the engine, one or more other IET tags affixed to other objects in the engine, and/or a user device associated with a person who is assembling or repairing the engine, where such self-report might indicate that the washer is not the correct size and should be replaced with another washer of the correct size (and in some cases, might also send information regarding what size washer is required for the replacement). In some cases, the IET tag might receive image (or video) data from an image (or video) capture device that is external to the washer and/or the engine, and might base its determination of whether or not the washer is the correct size on such image (or video) data.

According to some embodiments, a nodeMCU (or other open source IoT platform) or the like might be used as a computing system or microprocessor for an IET tag affixed to a corresponding object that is sufficiently large for the nodeMCU (or other open source IoT platform) or the like to fit within a protective housing encapsulating the IET tag. For smaller objects that are too small for a nodeMCU or the like to fit, an Arduino Nano or other microprocessor or the like might be used as the computing system or microprocessor for the IET tag affixed to such small object, to fit within a protective housing encapsulating the IET tag. The nodeMCU or other open source IOT platform or other computing system might be trainable and might utilize artificial intelligence functionality to continuously or periodically analyze its status, location, and/or characteristics or the status, location, and/or characteristics of the object to which the IET tag is affixed. In some embodiments, the IET tag might communicate via hypertext transfer protocol ("HTTP"), via extensible messaging and presence protocol ("XMPP"), via message queuing telemetry transport ("MQTT") protocol, via LoRa protocol, via Bluetooth™ protocol, via Z-Wave protocol, via ZigBee protocol, via XBee protocol, or the like.

In an alternative non-limiting embodiment, in the construction of a house, for example, an architect might develop a blueprint or architectural plan of a building. A construction company might review the blueprint or architectural plan to determine a list of materials and amounts of such materials to build the house. Such materials might include, without limitation, wooden beams, flooring tiles, flooring boards, wall tiles, roofing tiles, drywall pieces, bricks, wooden boards, steel support beams, rebar pieces, nails, screws, brackets, etc. (collectively, "objects" or the like). For each such objects, an IET tag as described herein might be affixed thereto (in some cases, within a protective housing or the like). Each IET tag among a first set of IET tags might be affixed to the corresponding object at time of manufacturing of the object. Alternatively, and/or additionally, each IET tag among a second set of IET tags might be affixed to the corresponding object after manufacturing (in the case, for instance, that such objects are not normally manufactured with IET tags affixed during such manufacturing process). Each IET tag among the first and second sets of IET tags affixed to the objects that, when assembled, form the structure of the house might have access to the architectural plan or at least a portion of the architectural plan pertaining to the portion of the house where such object is assigned (or self-assigned) to be disposed. For example, the IET tag affixed to a brick that is intended to form the front façade of the house might self-assign (or might be assigned by a computing system that manages or coordinates building of the house, or the like) its position within the front façade of the house (e.g., third brick from the bottom (i.e., floor), fourth brick from the right corner of the house, etc.). The IET tag might self-report to the computing system and/or to a user device(s) associated with a construction worker(s), contractor(s), or sub-contractor(s) assembling or building the front façade if the brick is positioned in an incorrect position or orientation, or the like. AI functionality at the computing system level and/or at the IET tag level may be used to facilitate such self-assignment or self-reporting.

In another example, the IET tag affixed to a nail that is intended to secure a particular drywall board to studs of the frame of the house might also have access to the architectural plan or at least a portion of the architectural plan pertaining to the portion of the house where such object (i.e., nail in this case) is assigned (or self-assigned) to be disposed. In some cases, IET tag may also have access to information regarding the tolerances of the object (in this case, the nail), and in some instances, the architectural plan might also include what size nails are required for each portion of the house to be constructed. During construction of the house, if a construction worker, contractor, or sub-contractor were to try to hammer the nail in a portion which requires a larger nail (i.e., having greater strength or length, or the like), the IET tag affixed to the nail might self-report to the computing system and/or a user device(s) associated with the construction worker, contractor, or sub-contractor indicating to replace the nail with the correct sized nail. In some cases, external or internal sensors may be used to provide information to the IET tag to help determination of correct or incorrect placement or assembly of the object relative to other objects or in accordance with the architectural plan, or the like.

In this manner, the IET tags provide intelligence enabled things functionality to the assembly or construction of the house. In a similar manner, other objects (e.g., other building structures, vehicles, machines, etc.) may be assembled or constructed using intelligence enabled things functionality to facilitate efficient and improved construction of the objects. As a further extension of such functionality, the IET tags may continue to self-analyze and self-report their status over time. For example, in the house example, the house might shift over time due to shifting of the soil or the like that cause sub-objects in the house to shift relative to each other (which might result in nail pops, shifted walls, shifted floors, etc.). The IET tags affixed to popped nails might self-report to the computing system and/or to a user device(s) associated with the homeowner or with the builder of the home, or the like to indicate the location of the popped nail and, in conjunction with sensor data analysis, might also determine whether the popped nail is still viable or should be replaced when compared to its tolerance values or the like.

These and other functionalities of the IET tag system may be described in detail with respect to FIGS. 2-4 below.

Figure 2:
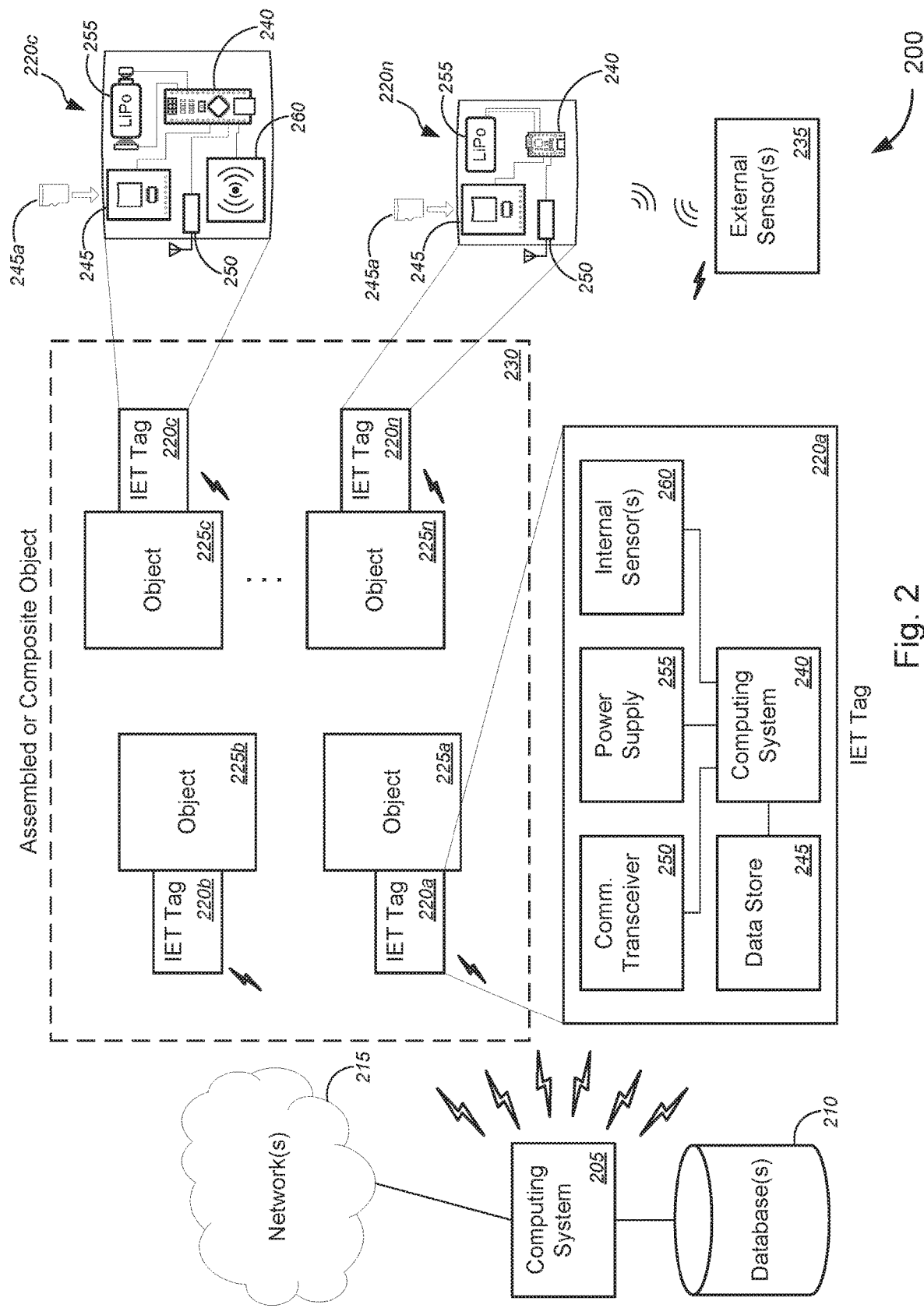
FIG. 2 is a schematic diagram illustrating another system for implementing IET, in accordance with various embodiments.

FIG. 2 is a schematic diagram illustrating another system 200 for implementing IET, in accordance with various embodiments.

In the non-limiting embodiment of FIG. 2, system 200 might comprise a computing system 205 and corresponding database(s) 210. System 200 might further comprise a network(s) 215. System 200 might further comprise a plurality of IET tags 220a-220n, each IET tag 220 being affixed to an object 225*a*-225*n* among a plurality of objects 225 that, when assembled, form an assembled or composite object 230. System 200 might also comprise one or more external sensors 235.

In some embodiments, each IET tag 220 might include, without limitation, at least one of a computing system 240, a datastore 245 (which might include a memory device 245*a*, e.g., a secure digital ("SD") card, a microSD card, a compact flash card, a solid-state drive ("SSD") device, or other memory storage devices, or the like), a communications transceiver 250, a power supply 255 (which might include, without limitation, a lithium polymer battery, a lithium ion battery, or other suitable compact batteries, and/or the like), or a sensor(s) 260. In some cases, the power supply 255 might comprise a wirelessly charging battery that charges when in range of or in close proximity to (but not necessarily in physical contact with) a wireless charging system, which may receive electrical power through an electrical grid, a solar panel, a wind-based power source, or other suitable power sources, etc. The computing system 240, data store 245, communications transceiver 250, power supply 255, and sensor(s) 260 (if present) might be housed within a light and durable enclosure (e.g., rugged hard plastic, metal, or combination of metal and plastic) or a resin coating or other covering that might provide thermal and/or physical protection while the IET tags 220 are affixed to the objects 225.

In operation, a first IET tag (e.g., one of IET tag 220*a*-220*n*) affixed to a first object among the plurality of objects (e.g., one of objects 225*a*-225*n*) might receive information regarding at least one of the first object or one or more nearby objects (e.g., among the plurality of objects 225, or the like). The first IET tag might determine a status of the at least one of the first object or the one or more nearby objects based at least in part on the received information regarding the at least one of the first object or the one or more nearby objects and based at least in part on first data assigned to the first IET tag. The first IET tag might analyze the determined status to determine whether the determined status exceeds predetermined thresholds for normal parameters for the at least one of the first object or the one or more nearby objects. Based on the determination that the determined status exceeds predetermined thresholds for normal parameters for the at least one of the first object or the one or more nearby objects, the first IET tag might autonomously self-report to a computing system (e.g., computing system 205*a* or 205*b*, or the like) a state of the at least one of the first object or the one or more nearby objects.

Merely by way of example, in some instances, the first data might include, but is not limited to, at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects, and/or the like.

According to some embodiments, receiving the information regarding the at least one of the first object or the one or more nearby objects might comprise receiving, from one or more sensors disposed on at least one object among the plurality of objects, sensor data regarding the at least one of the first object or the one or more nearby objects. In some cases, the sensor data might include, without limitation, at least one of image data, video data, radar data, lidar data, temperature data, humidity data, moisture data, ambient light data, seismic data, vibration data, location data, or proximity data, and/or the like. Alternatively, or additionally, receiving the information regarding the at least one of the first object or the one or more nearby objects might comprise receiving, from one or more external devices within proximity to the at least one of the first object or the one or more nearby objects, external sensor data regarding the at least one of the first object or the one or more nearby objects. In some instances, the one or more external devices might each include, but is not limited to, one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor, and/or the like.

In some embodiments, autonomously self-reporting the state of the at least one of the first object or the one or more nearby objects might comprise autonomously sending, with the first IET tag and to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

According to some embodiments, the plurality of objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the plurality of objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

In some embodiments, the plurality of objects, when assembled, might form part of a vehicle, which might include, but is not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. The plurality of objects might include, without limitation, at least one of one or more vehicle engine component pieces, one or more vehicle control system component pieces, one or more vehicle control panel pieces, one or more steering component pieces, one or more gear shift components, one or more braking system component pieces, one or more fuel injection component pieces, one or more fuel storage component pieces, one or more vehicle sensor component pieces, one or more vehicle battery component pieces, one or more vehicle batteries, one or more electrical system component pieces, one or more electronics system components, one or more communications system component pieces, one or more vehicle exterior panel pieces, one or more chassis components, one or more exhaust system components, one or more windshield pieces, one or more window pieces, one or more window opening and closing mechanism components, one or more door components, one or more door lock component pieces, one or more door handle component pieces, one or more wiper components, one or more bolts, one or more nuts, one or more screws, one or more brackets, one or more hinges, one or more springs, one or more clamps, one or more mountings, one or more display component pieces, one or more lighting system components, one or more signal light system components, one or more environmental control components, one or more tires, one or more wheels, one or more seat components, one or more seatbelt components, one or more seat adjustment control components, one or more suspension system components, one or more storage container components, one or more wing components, one or more rotor components, one or more propeller system components, one or more hull components, one or more keel components, one or more mast components, one or more boom components, one or more sail pieces, one or more tiller components, one or more rudder components, one or more doorway components, one or more porthole components, one or more antenna components, one or more foot pedal components, one or more frame components, one or more subframe components, one or more fender component, one or more throttle components, one or more chain components, one or more pump system components, one or more handle components, or one or more mirror components, and/or the like.

According to some embodiments, the plurality of objects, when assembled, might form part of a machine. In such cases, the plurality of objects might include, but is not limited to, at least one of one or more mechanical component pieces, one or more electrical system component pieces, one or more electronics system components, one or more communications system components, one or more control system component pieces, one or more display system component pieces, one or more user interface system components, one or more housing pieces, one or more frame component pieces, one or more subframe component pieces, one or more latching system components, one or more power supply system components, one or more bolts, one or more nuts, one or more screws, one or more brackets, one or more hinges, one or more springs, one or more clamps, one or more mountings, one or more lighting system component pieces, one or more display light system component pieces, one or more handle components, one or more foot component pieces, one or more wheel component pieces, or one or more locking system components, and/or the like.

Figure 3A:
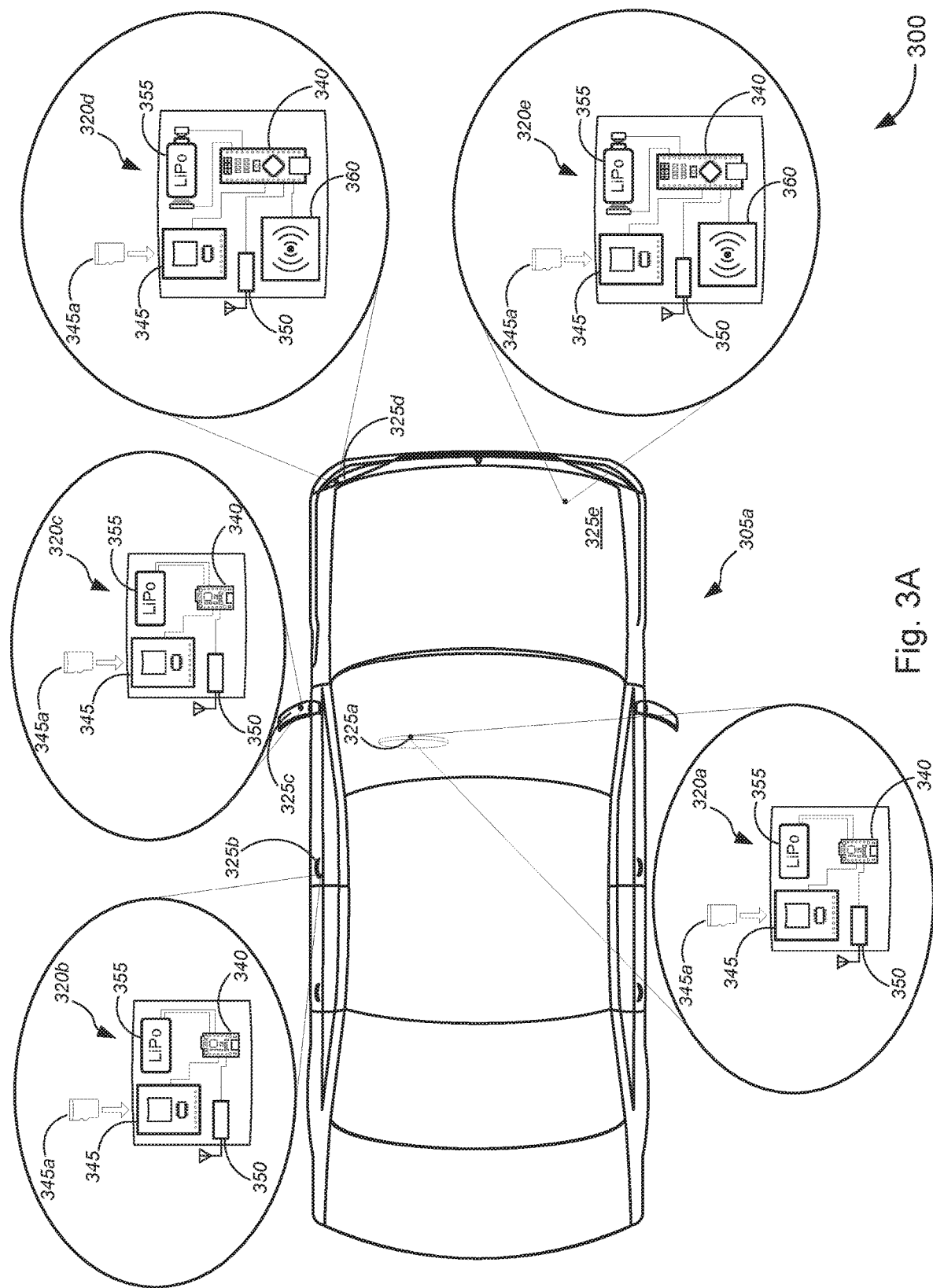
FIGS. 3A and 3B are schematic diagrams illustrating various non-limiting examples of assembled or composite objects that are formed from a plurality of objects to which IET tags are affixed, in accordance with various embodiments.
Figure 3B:
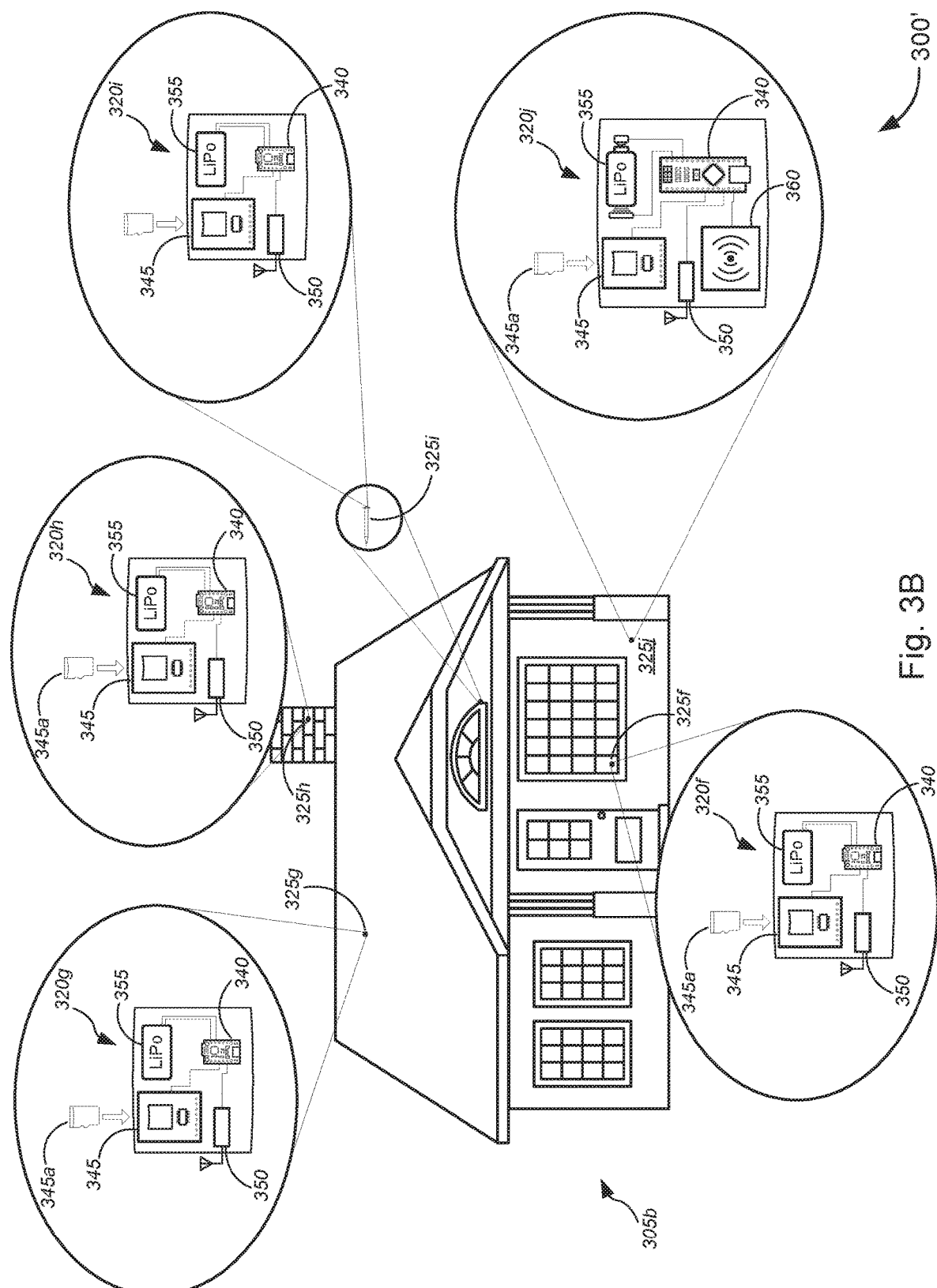
Figure 4:
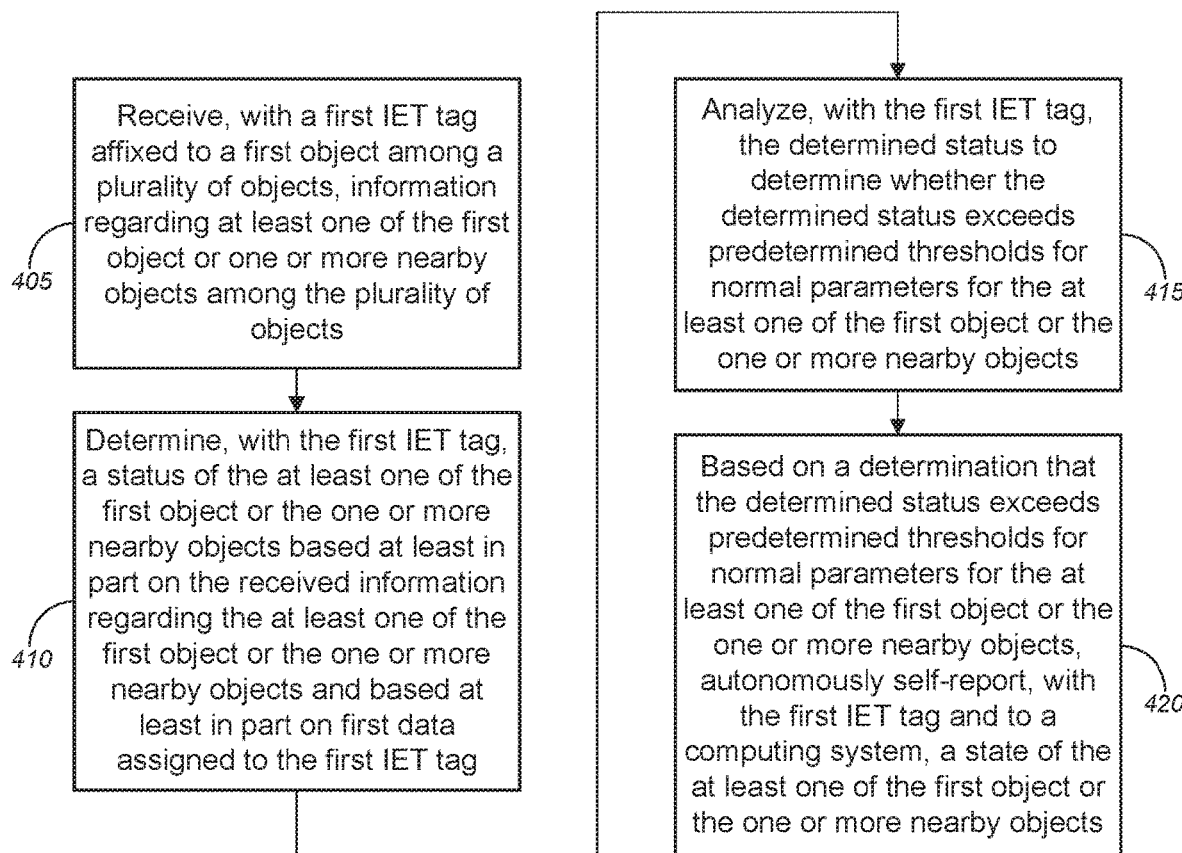
FIG. 4 is a flow diagram illustrating a method for implementing IET, in accordance with various embodiments.

These and other functionalities of the IET tag system may be described in detail with respect to FIGS. 1, 3, and 4.

FIGS. 3A and 3B (collectively, "FIG. 3") are schematic diagrams illustrating various non-limiting examples 300 and 300' of assembled or composite objects that are formed from a plurality of objects to which IET tags are affixed, in accordance with various embodiments. FIG. 3A depicts a vehicle 305a (in this case, a car, or the like), while FIG. 3B depicts a building 305b (in this case, a house, or the like).

With reference to the non-limiting embodiment 300 of FIG. 3A, a first IET tag 320a, a second IET tag 320b, a third IET tag 320c, a fourth IET tag 320d, and a fifth IET tag 320e among a plurality of IET tags 320, each IET tag 320 being affixed to an object 325a-325e among a plurality of objects 325 that, when assembled, forms an assembled or composite object (in this case, vehicle 305a, or the like). In some embodiments, each IET tag 320 might include, without limitation, at least one of a computing system 340, a datastore 345 (which might include a memory device 345a, e.g., a secure digital ("SD") card, a microSD card, a compact flash card, a solid-state drive ("SSD") device, or other memory storage devices, or the like), a communications transceiver 350, a power supply 355 (which might include, without limitation, a lithium polymer battery, a lithium ion battery, or other suitable compact batteries, and/or the like), or a sensor(s) 360. In some cases, the power supply 355 might comprise a wirelessly charging battery that charges when in range of or in close proximity to (but not necessarily in physical contact with) a wireless charging system, which may receive electrical power through an electrical grid, a solar panel, a wind-based power source, or other suitable power sources, etc. The computing system 340, data store 345, communications transceiver 350, power supply 355, and sensor(s) 360 (if present) might be housed within a light and durable enclosure (e.g., rugged hard plastic, metal, or combination of metal and plastic) or a resin coating or other covering that might provide thermal and/or physical protection while the IET tags 320 are affixed to the objects 325.

For example, as depicted in FIG. 3A, the first IET tag 320*a* might be affixed to a piece of the steering wheel 325*a*, while the second IET tag 320*b* might be affixed to a portion of a handle 325*b* of a door of the vehicle 305*a*, and the third IET tag 320*c* might be affixed to a portion of side mirror 325*c* of the vehicle 305*a*, while the fourth IET tag 320*d* might be affixed to a portion of one of the headlights 325*d* of the vehicle 305*a*, and the fifth IET tag 320*e* might be affixed to a portion of the hood 325*e* of the vehicle 305*a*, and so on.

Turning to the non-limiting embodiment of 300' of FIG. 3B, a sixth IET tag 320*f*, a seventh IET tag 320*g*, an eighth IET tag 320*h*, a ninth IET tag 320*i*, and a tenth IET tag 320*j* among a plurality of IET tags 320, each IET tag 320 being affixed to an object 325*f*-325*j* among a plurality of objects 325 that, when assembled, forms an assembled or composite object (in this case, house 305*b*, or the like). In some embodiments, each IET tag 320 might include, without limitation, at least one of a computing system 340, a datastore 345 (which might include a memory device 345*a*, e.g., a secure digital ("SD") card, a microSD card, a compact flash card, a solid-state drive ("SSD") device, or other memory storage devices, or the like), a communications transceiver 350, a power supply 355 (which might include, without limitation, a lithium polymer battery, a lithium ion battery, and/or the like), or a sensor(s) 360. The computing system 340, data store 345, communications transceiver 350, power supply 355, and sensor(s) 360 (if present) might be housed within a light and durable enclosure (e.g., rugged hard plastic, metal, or combination of metal and plastic) or a resin coating or other covering that might provide thermal and/or physical protection while the IET tags 320 are affixed to the objects 325.

Although a car is shown in FIG. 3A, the various embodiments are not so limited, and any vehicle (including, but not limited to, minivans, pickup trucks, motorcycles, all-terrain vehicles, scooters, police vehicles, fire engines, ambulances, recreational vehicles, semi-tractor-trailer trucks, commercial trucks, buses, boats, ships, submersibles, amphibious vehicles, airplanes, helicopters, space vehicles, etc.) may benefit from IET functionality as shown and described herein.

For example, as depicted in FIG. 3B, the sixth IET tag 320*f* might be affixed to a piece of a window pane 325*f* of the house 305*b*, while the seventh IET tag 320*g* might be affixed to a portion of a roof tile or shingle 325*g* of the house 305*b*, and the eighth IET tag 320*h* might be affixed to a portion of a chimney brick 325*h* of the house 305*b*, while the ninth IET tag 320*i* might be affixed to a portion of one of a plurality of nails 325*i* of the house 305*b*, and the tenth IET tag 320*j* might be affixed to a portion of the wall panel 325*j* of the house 305*b*, and so on.

Although a car is shown in FIG. 3B, the various embodiments are not so limited, and any building structure (including, but not limited to, buildings, towers, tunnels, bridges, railways, roads, industrial facilities, parking structures, aqueducts, viaducts, canals, dams, waterfront structures, or retaining walls, etc.) may benefit from IET functionality as shown and described herein.

Although not shown, machines may also benefit from IET functionality as shown and described herein. Particularly, as microprocessors, sensors, and other circuit components that are used within the IET tags become smaller and smaller due to advancements in technology, such machines might include, without limitation, user devices (e.g., smart phones, mobile phones, tablet computers, laptop computers, desktop computers, televisions, media players, game consoles, remote controllers, etc.), home appliances (e.g., refrigerators, ovens, ranges, microwave ovens, toasters, rice makers, pressure cookers, dish washers, washers, dryers, etc.), office machines (e.g., printers, monitors, office computers, servers, projectors, etc.), industrial machines (e.g., robots, conveyors, tools, etc.), and/or the like.

FIG. 4 is a flow diagram illustrating a method 400 for implementing IET, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, and 300' of FIGS. 1, 2, 3A, and 3B, respectively (or components thereof), such methods may also be implemented using any suitable hardware (or software) implementation. Similarly, while each of the systems, examples, or embodiments 100, 200, 300, and 300' of FIGS. 1, 2, 3A, and 3B, respectively (or components thereof), can operate according to the method 400 illustrated by FIG. 4 (e.g., by executing instructions embodied on a computer readable medium), the systems, examples, or embodiments 100, 200, 300, and 300' of FIGS. 1, 2, 3A, and 3B can each also operate according to other modes of operation and/or perform other suitable procedures.

In the non-limiting embodiment of FIG. 4, method 400, at block 405, might comprise receiving, with a first IET tag affixed to a first object among a plurality of objects, information regarding at least one of the first object or one or more nearby objects among the plurality of objects. At block 410, method 400 might comprise determining, with the first IET tag, a status of the at least one of the first object or the one or more nearby objects based at least in part on the received information regarding the at least one of the first object or the one or more nearby objects and based at least in part on first data assigned to the first IET tag. Method 400 might further comprise analyzing, with the first IET tag, the determined status to determine whether the determined status exceeds predetermined thresholds for normal parameters for the at least one of the first object or the one or more nearby objects (block 415). Method 400 might further comprise, at block 420, based on a determination that the determined status exceeds predetermined thresholds for normal parameters for the at least one of the first object or the one or more nearby objects, autonomously self-reporting, with the first IET tag and to a computing system, a state of the at least one of the first object or the one or more nearby objects.

In some embodiments, the first IET tag might include, without limitation, at least one of an open source IoT platform, a microprocessor, a microcontroller, a processor, or a portable computer, and/or the like. According to some embodiments, the first IET tag might further include, but is not limited to, at least one of one or more sensors, one or more power sources, one or more communications transceivers, or a protective housing, and/or the like. In some cases, the computing system might include, without limitation, at least one of an open source IoT platform, a microprocessor, a microcontroller, a processor, a portable computer, a server, a distributed computing system, or a cloud-based computing system, and/or the like.

Merely by way of example, in some instances, the first data might include, but is not limited to, at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects, and/or the like.

According to some embodiments, receiving the information regarding the at least one of the first object or the one or more nearby objects might comprise receiving, from one or more sensors disposed on at least one object among the plurality of objects, sensor data regarding the at least one of the first object or the one or more nearby objects. In some cases, the sensor data might include, without limitation, at least one of image data, video data, radar data, lidar data, temperature data, humidity data, moisture data, ambient light data, seismic data, vibration data, location data, or proximity data, and/or the like. Alternatively, or additionally, receiving the information regarding the at least one of the first object or the one or more nearby objects might comprise receiving, from one or more external devices within proximity to the at least one of the first object or the one or more nearby objects, external sensor data regarding the at least one of the first object or the one or more nearby objects. In some instances, the one or more external devices might each include, but is not limited to, one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor, and/or the like.

In some embodiments, autonomously self-reporting the state of the at least one of the first object or the one or more nearby objects might comprise autonomously sending, with the first IET tag and to the computing system, one or more of: a message indicating that the at least one of the first object or the one or more nearby objects has a temperature exceeding a tolerance value in accordance with the first data assigned to the first IET tag; a message indicating that the at least one of the first object or the one or more nearby objects is within an area having humidity or moisture levels exceeding a tolerance amount in accordance with the first data assigned to the first IET tag; a message indicating that the at least one of the first object or the one or more nearby objects is within an area having light levels exceeding a tolerance amount in accordance with the first data assigned to the first IET tag; a message indicating that the at least one of the first object or the one or more nearby objects has changed in shape exceeding a tolerance amount in accordance with the first data assigned to the first IET tag; a message indicating that the at least one of the first object or the one or more nearby objects is not an appropriate object in terms of at least one of size or shape to be fit relative to at least one other object among the plurality of objects; a message indicating that the at least one of the first object or the one or more nearby objects is vibrating beyond a tolerance amount relative to an amount as indicated in the first data assigned to the first IET tag; a message indicating that the at least one of the first object or the one or more nearby objects has shifted in position beyond a tolerance amount relative to at least one other object among the plurality of objects in accordance with the first data assigned to the first IET tag; a message indicating that the at least one of the first object or the one or more nearby objects is not properly positioned in a location relative to at least one other object among the plurality of objects as indicated in the first data assigned to the first IET tag; a message indicating that the at least one of the first object or the one or more nearby objects is of a type that is different from a type that is required among the plurality of objects in accordance with the first data assigned to the first IET tag; a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag; and/or the like.

According to some embodiments, the plurality of objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the plurality of objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

In some embodiments, the plurality of objects, when assembled, might form part of a vehicle, which might include, but is not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. The plurality of objects might include, without limitation, at least one of one or more vehicle engine component pieces, one or more vehicle control system component pieces, one or more vehicle control panel pieces, one or more steering component pieces, one or more gear shift components, one or more braking system component pieces, one or more fuel injection component pieces, one or more fuel storage component pieces, one or more vehicle sensor component pieces, one or more vehicle battery component pieces, one or more vehicle batteries, one or more electrical system component pieces, one or more electronics system components, one or more communications system component pieces, one or more vehicle exterior panel pieces, one or more chassis components, one or more exhaust system components, one or more windshield pieces, one or more window pieces, one or more window opening and closing mechanism components, one or more door components, one or more door lock component pieces, one or more door handle component pieces, one or more wiper components, one or more bolts, one or more nuts, one or more screws, one or more brackets, one or more hinges, one or more springs, one or more clamps, one or more mountings, one or more display component pieces, one or more lighting system components, one or more signal light system components, one or more environmental control components, one or more tires, one or more wheels, one or more seat components, one or more seatbelt components, one or more seat adjustment control components, one or more suspension system components, one or more storage container components, one or more wing components, one or more rotor components, one or more propeller system components, one or more hull components, one or more keel components, one or more mast components, one or more boom components, one or more sail pieces, one or more tiller components, one or more rudder components, one or more doorway components, one or more porthole components, one or more antenna components, one or more foot pedal components, one or more frame components, one or more subframe components, one or more fender component, one or more throttle components, one or more chain components, one or more pump system components, one or more handle components, or one or more mirror components, and/or the like.

According to some embodiments, the plurality of objects, when assembled, might form part of a machine. In such cases, the plurality of objects might include, but is not limited to, at least one of one or more mechanical component pieces, one or more electrical system component pieces, one or more electronics system components, one or more communications system components, one or more control system component pieces, one or more display system component pieces, one or more user interface system components, one or more housing pieces, one or more frame component pieces, one or more subframe component pieces, one or more latching system components, one or more power supply system components, one or more bolts, one or more nuts, one or more screws, one or more brackets, one or more hinges, one or more springs, one or more clamps, one or more mountings, one or more lighting system component pieces, one or more display light system component pieces, one or more handle components, one or more foot component pieces, one or more wheel component pieces, or one or more locking system components, and/or the like.

Exemplary System and Hardware Implementation

Figure 5:
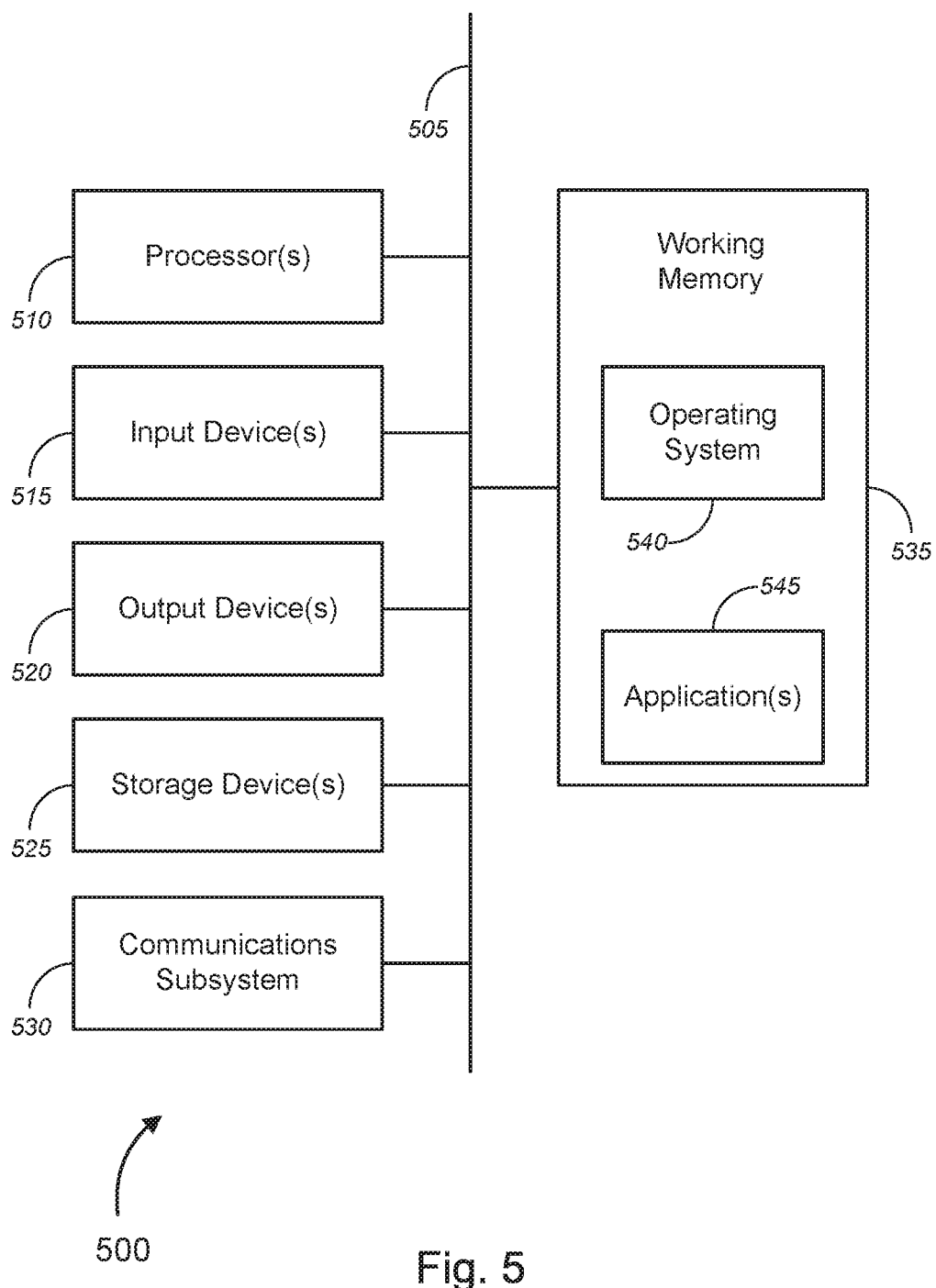
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105*a*, 105*b*, and 205, intelligence enabled things ("IET") tags 120*a*-120*n*, 220*a*-220*n*, and 320*a*-320*j*, external sensors 135*a*-135*n* and 235, computing system 240 and 340, internal sensors 260 and 360, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105*a*, 105*b*, and 205, IET tags 120*a*-120*n*, 220*a*-220*n*, and 320*a*-320*j*, external sensors 135*a*-135*n* and 235, computing system 240 and 340, internal sensors 260 and 360, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
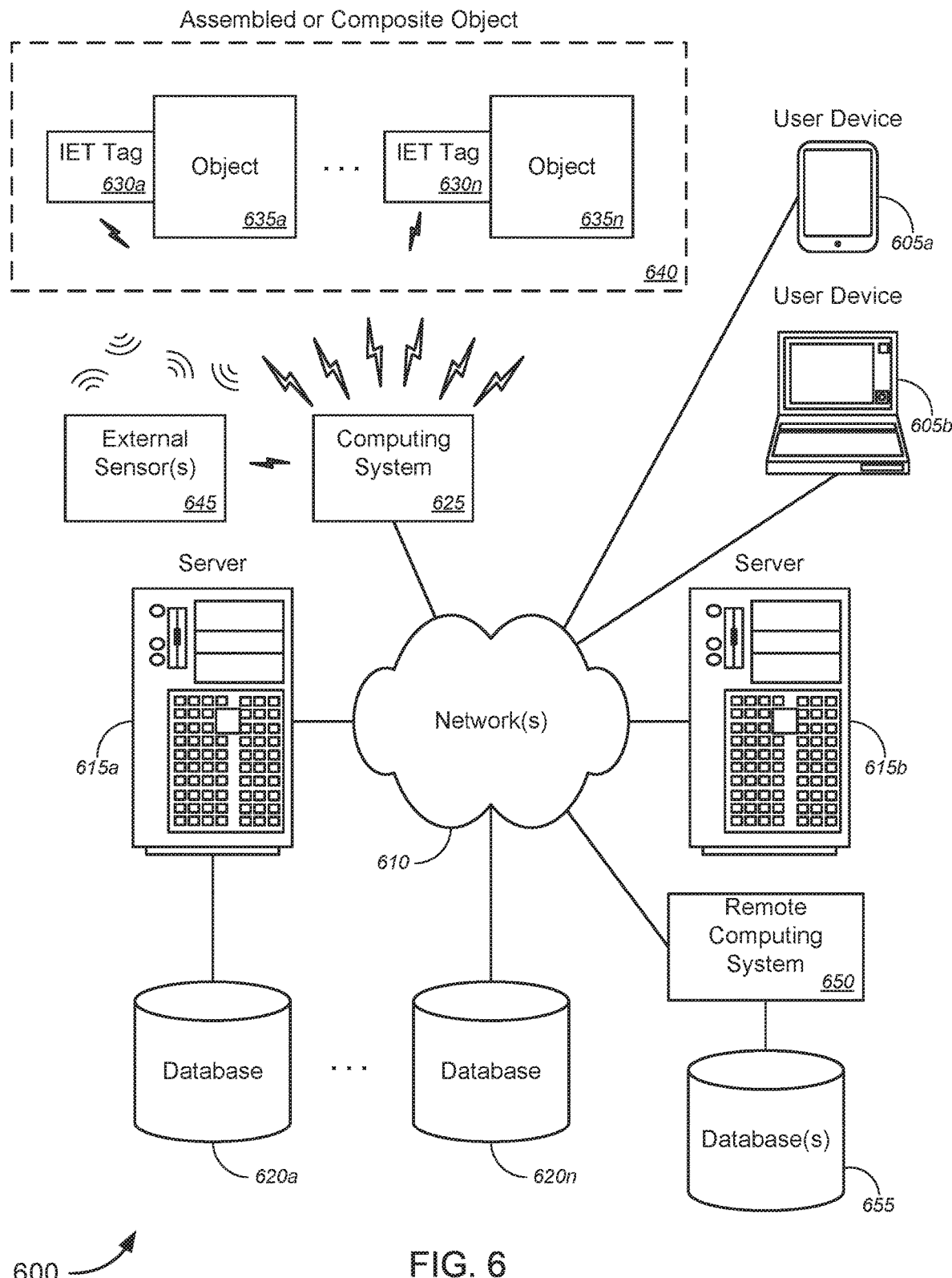
FIG. 6 is a block diagram illustrating a networked system of computers, computing systems, or system hardware architecture, which can be used in accordance with various embodiments.

As noted above, a set of embodiments comprises methods and systems for implementing communications among objects, and, more particularly, to methods, systems, and apparatuses for implementing intelligence enabled things ("IET"). FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 115 of FIG. 1 or network(s) 215 of FIG. 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing site survey, and, more particularly, to methods, systems, and apparatuses for implementing drone-based rf site survey ns, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625 (similar to computing systems 105*a* and 205 of FIGS. 1 and 2, or the like), intelligence enabled things ("IET") tags 630*a*-630*n* (similar to IET tags 120*a*-120*n*, 220*a*-220*n*, and 320*a*-320*j* of FIGS. 1-3, or the like) affixed to objects 635*a*-635*n* (similar to objects 125*a*-125*n*, 225*a*-225*n*, 325*a*-325*j* of FIGS. 1-3, or the like) that, when assembled together, form assembled or composite object 640 (similar to assembled or composite objects 130, 230, 305*a*, and 305*b* of FIGS. 1-3, or the like), external sensor(s) 645 (similar to external sensors 135*a*-135*n* and 235 of FIGS. 1 and 2, or the like), and remote computing system 650 and corresponding database(s) 655 (similar to computing system 105*b* and corresponding database(s) 110*b* of FIG. 1, or the like).

In operation, a first IET tag (e.g., one of IET tag 630*a*-630*n*) affixed to a first object among the plurality of objects (e.g., one of objects 635*a*-635*n*) might receive information regarding at least one of the first object or one or more nearby objects (e.g., among the plurality of objects 640, or the like). The first IET tag might determine a status of the at least one of the first object or the one or more nearby objects based at least in part on the received information regarding the at least one of the first object or the one or more nearby objects and based at least in part on first data assigned to the first IET tag. The first IET tag might analyze the determined status to determine whether the determined status exceeds predetermined thresholds for normal parameters for the at least one of the first object or the one or more nearby objects. Based on the determination that the determined status exceeds predetermined thresholds for normal parameters for the at least one of the first object or the one or more nearby objects, the first IET tag might autonomously self-report to a computing system (e.g., computing system 625, or the like) a state of the at least one of the first object or the one or more nearby objects.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing intelligence enabled things ("IET"), the method comprising:
    receiving, with a first IET tag affixed to a first object among a plurality of objects, information regarding at least one of the first object or one or more nearby objects among the plurality of objects;
    determining, with the first IET tag, a status of the at least one of the first object or the one or more nearby objects based at least in part on the received information regarding the at least one of the first object or the one or more nearby objects and based at least in part on first data assigned to the first IET tag;
    analyzing, with the first IET tag, the determined status to determine whether the determined status exceeds predetermined thresholds for normal parameters for the at least one of the first object or the one or more nearby objects; and
    based on the determination that the determined status exceeds predetermined thresholds for normal parameters for the at least one of the first object or the one or more nearby objects, autonomously self-reporting, with the first IET tag and to a computing system, a state of the at least one of the first object or the one or more nearby objects.

2. The method of claim 1, wherein the first IET tag comprises at least one of an open source IoT platform, a microprocessor, a microcontroller, a processor, or a portable computer.

3. The method of claim 1, wherein the first IET tag further comprises at least one of one or more sensors, one or more power sources, one or more communications transceivers, or a protective housing.

4. The method of claim 1, wherein the computing system comprises at least one of an open source IoT platform, a microprocessor, a microcontroller, a processor, a portable computer, a server, a distributed computing system, or a cloud-based computing system.

5. The method of claim 1, wherein the first data comprises at least one of tag identification data, information regarding a type of the first object, information regarding a function of the first object within the plurality of objects, information regarding a relative position of the first object within the plurality of objects, information regarding tolerances for the first object, information regarding attributes of the first object, information regarding a type of each of the one or more nearby objects, information regarding a function of each of the one or more nearby objects, information regarding a relative position of each of the one or more nearby objects, information regarding tolerances for each of the one or more nearby objects, or information regarding attributes of each of the one or more nearby objects.

6. The method of claim 1, wherein receiving the information regarding the at least one of the first object or the one or more nearby objects comprises receiving, from one or more sensors disposed on at least one object among the plurality of objects, sensor data regarding the at least one of the first object or the one or more nearby objects.

7. The method of claim 6, wherein the sensor data comprises at least one of image data, video data, radar data, lidar data, temperature data, humidity data, moisture data, ambient light data, seismic data, vibration data, location data, or proximity data.

8. The method of claim 1, wherein receiving the information regarding the at least one of the first object or the one or more nearby objects comprises receiving, from one or more external devices within proximity to the at least one of the first object or the one or more nearby objects, external sensor data regarding the at least one of the first object or the one or more nearby objects.

9. The method of claim 8, wherein the one or more external devices each comprises one of an image capture device, a video capture device, an external radar sensor, an external lidar sensor, an external thermal sensor, an external humidity sensor, an external moisture sensor, an external light sensor, an external seismic sensor, an external vibration sensor, an external location sensor, or an external proximity sensor.

10. The method of claim 1, wherein autonomously self-reporting the state of the at least one of the first object or the one or more nearby objects comprises autonomously sending, with the first IET tag and to the computing system, one or more of:

a message indicating that the at least one of the first object or the one or more nearby objects has a temperature exceeding a tolerance value in accordance with the first data assigned to the first IET tag;

a message indicating that the at least one of the first object or the one or more nearby objects is within an area having humidity or moisture levels exceeding a tolerance amount in accordance with the first data assigned to the first IET tag;

a message indicating that the at least one of the first object or the one or more nearby objects is within an area having light levels exceeding a tolerance amount in accordance with the first data assigned to the first IET tag;

a message indicating that the at least one of the first object or the one or more nearby objects has changed in shape exceeding a tolerance amount in accordance with the first data assigned to the first IET tag;

a message indicating that the at least one of the first object or the one or more nearby objects is not an appropriate object in terms of at least one of size or shape to be fit relative to at least one other object among the plurality of objects;

a message indicating that the at least one of the first object or the one or more nearby objects is vibrating beyond a tolerance amount relative to an amount as indicated in the first data assigned to the first IET tag;

a message indicating that the at least one of the first object or the one or more nearby objects has shifted in position beyond a tolerance amount relative to at least one other object among the plurality of objects in accordance with the first data assigned to the first IET tag;

a message indicating that the at least one of the first object or the one or more nearby objects is not properly positioned in a location relative to at least one other object among the plurality of objects as indicated in the first data assigned to the first IET tag;

a message indicating that the at least one of the first object or the one or more nearby objects is of a type that is different from a type that is required among the plurality of objects in accordance with the first data assigned to the first IET tag;

a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag.

11. The method of claim 1, wherein the plurality of objects, when assembled, forms part of one of a building, a tower, a tunnel, a bridge, a railway, a road, an industrial facility, a parking structure, an aqueduct, a viaduct, a canal, a dam, a waterfront structure, or a retaining wall, wherein the plurality of objects comprises at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces.

12. The method of claim 1, wherein the plurality of objects, when assembled, forms part of a vehicle, wherein the plurality of objects comprises at least one of one or more vehicle engine component pieces, one or more vehicle control system component pieces, one or more vehicle control panel pieces, one or more steering component pieces, one or more gear shift components, one or more braking system component pieces, one or more fuel injection component pieces, one or more fuel storage component pieces, one or more vehicle sensor component pieces, one or more vehicle battery component pieces, one or more vehicle batteries, one or more electrical system component pieces, one or more electronics system components, one or more communications system component pieces, one or more vehicle exterior panel pieces, one or more chassis components, one or more exhaust system components, one or more windshield pieces, one or more window pieces, one or more window opening and closing mechanism components, one or more door components, one or more door lock component pieces, one or more door handle component pieces, one or more wiper components, one or more bolts, one or more nuts, one or more screws, one or more brackets, one or more hinges, one or more springs, one or more clamps, one or more mountings, one or more display component pieces, one or more lighting system components, one or more signal light system components, one or more environmental control components, one or more tires, one or more wheels, one or more seat components, one or more seatbelt components, one or more seat adjustment control components, one or more suspension system components, one or more storage container components, one or more wing components, one or more rotor components, one or more propeller system components, one or more hull components, one or more keel components, one or more mast components, one or more boom components, one or more sail pieces, one or more tiller components, one or more rudder components, one or more doorway components, one or more porthole components, one or more antenna components, one or more foot pedal components, one or more frame components, one or more subframe components, one or more fender component, one or more throttle components, one or more chain components, one or more pump system components, one or more handle components, or one or more mirror components.

13. The method of claim 1, wherein the plurality of objects, when assembled, forms part of a machine, wherein the plurality of objects comprises at least one of one or more mechanical component pieces, one or more electrical system component pieces, one or more electronics system components, one or more communications system components, one or more control system component pieces, one or more display system component pieces, one or more user interface system components, one or more housing pieces, one or more frame component pieces, one or more subframe component pieces, one or more latching system components, one or more power supply system components, one or more bolts, one or more nuts, one or more screws, one or more brackets, one or more hinges, one or more springs, one or more clamps, one or more mountings, one or more lighting system component pieces, one or more display light system component pieces, one or more handle components, one or more foot component pieces, one or more wheel component pieces, or one or more locking system components.

14. An intelligence enabled things ("IET") tag affixed to a first object among a plurality of objects, the IET tag comprising:
at least one processor; and
a non-transitory computer readable medium communicatively coupled to the at least one processor, the non-transitory computer readable medium having stored thereon computer software comprising a set of instructions that, when executed by the at least one processor, causes the IET tag to:
receive information regarding at least one of the first object or one or more nearby objects among the plurality of objects;
determine a status of the at least one of the first object or the one or more nearby objects based at least in part on the received information regarding the at least one of the first object or the one or more nearby objects and based at least in part on first data assigned to the first IET tag;
analyze the determined status to determine whether the determined status exceeds predetermined thresholds for normal parameters for the at least one of the first object or the one or more nearby objects; and
based on the determination that the determined status exceeds predetermined thresholds for normal parameters for the at least one of the first object or the one or more nearby objects, autonomously self-report, to a computing system, a state of the at least one of the first object or the one or more nearby objects.

15. The IET tag of claim 14, wherein the IET tag comprises at least one of an open source IoT platform, a microprocessor, a microcontroller, a processor, or a portable computer.

16. The IET tag of claim 14, wherein the IET tag further comprises at least one of one or more sensors, one or more power sources, one or more communications transceivers, or a protective housing.

17. The IET tag of claim 14, wherein the computing system comprises at least one of an open source IoT platform, a microprocessor, a microcontroller, a processor, a portable computer, a server, a distributed computing system, or a cloud-based computing system.

18. A system for implementing intelligence enabled things ("IET"), the system comprising:
an IET tag affixed to a first object among a plurality of objects, the IET tag comprising:
at least one processor; and
a non-transitory computer readable medium communicatively coupled to the at least one processor, the non-transitory computer readable medium having stored thereon computer software comprising a set of instructions that, when executed by the at least one processor, causes the IET tag to:
receive information regarding at least one of the first object or one or more nearby objects among the plurality of objects;
determine a status of the at least one of the first object or the one or more nearby objects based at least in part on the received information regarding the at least one of the first object or the one or more nearby objects and based at least in part on first data assigned to the first IET tag;
analyze the determined status to determine whether the determined status exceeds predetermined thresholds for normal parameters for the at least one of the first object or the one or more nearby objects; and
based on the determination that the determined status exceeds predetermined thresholds for normal parameters for the at least one of the first object or the one or more nearby objects, autonomously self-report, to a computing system, a state of the at least one of the first object or the one or more nearby objects.

19. The system of claim 18, wherein the IET tag comprises at least one of an open source IoT platform, a microprocessor, a microcontroller, a processor, or a portable computer.

20. The system of claim 18, wherein autonomously self-reporting the state of the at least one of the first object or the one or more nearby objects comprises autonomously sending, to the computing system, one or more of:
a message indicating that the at least one of the first object or the one or more nearby objects has a temperature exceeding a tolerance value in accordance with the first data assigned to the first IET tag;
a message indicating that the at least one of the first object or the one or more nearby objects is within an area having humidity or moisture levels exceeding a tolerance amount in accordance with the first data assigned to the first IET tag;

a message indicating that the at least one of the first object or the one or more nearby objects is within an area having light levels exceeding a tolerance amount in accordance with the first data assigned to the first IET tag;

a message indicating that the at least one of the first object or the one or more nearby objects has changed in shape exceeding a tolerance amount in accordance with the first data assigned to the first IET tag;

a message indicating that the at least one of the first object or the one or more nearby objects is not an appropriate object in terms of at least one of size or shape to be fit relative to at least one other object among the plurality of objects;

a message indicating that the at least one of the first object or the one or more nearby objects is vibrating beyond a tolerance amount relative to an amount as indicated in the first data assigned to the first IET tag;

a message indicating that the at least one of the first object or the one or more nearby objects has shifted in position beyond a tolerance amount relative to at least one other object among the plurality of objects in accordance with the first data assigned to the first IET tag;

a message indicating that the at least one of the first object or the one or more nearby objects is not properly positioned in a location relative to at least one other object among the plurality of objects as indicated in the first data assigned to the first IET tag;

a message indicating that the at least one of the first object or the one or more nearby objects is of a type that is different from a type that is required among the plurality of objects in accordance with the first data assigned to the first IET tag;

a message indicating that the at least one of the first object or the one or more nearby objects is not functioning within tolerance levels in accordance with the first data assigned to the first IET tag; or a message indicating that the at least one of the first object or the one or more nearby objects has attributes that have changed beyond tolerance levels in accordance with the first data assigned to the first IET tag.

* * * * *